United States Patent
Zhong et al.

(10) Patent No.: US 10,816,355 B2
(45) Date of Patent: Oct. 27, 2020

(54) METHOD AND APPARATUS FOR OBTAINING ABBREVIATED NAME OF POINT OF INTEREST ON MAP

(71) Applicant: Alibaba Group Holding Limited, George Town (KY)

(72) Inventors: Guanhai Zhong, Hangzhou (CN); Hui Li, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 306 days.

(21) Appl. No.: 16/031,507

(22) Filed: Jul. 10, 2018

(65) Prior Publication Data
US 2018/0335313 A1 Nov. 22, 2018

Related U.S. Application Data

(63) Continuation of application No. PCT/CN2017/000018, filed on Jan. 3, 2017.

(30) Foreign Application Priority Data

Jan. 11, 2016 (CN) .......................... 2016 1 0015852

(51) Int. Cl.
*G06F 7/00* (2006.01)
*G01C 21/36* (2006.01)
(Continued)

(52) U.S. Cl.
CPC ......... *G01C 21/3679* (2013.01); *G06F 16/00* (2019.01); *G06F 16/29* (2019.01); *G06F 40/279* (2020.01); *G06F 40/289* (2020.01)

(58) Field of Classification Search
CPC ...... G06F 16/313; G06F 16/367; G06F 16/00; G06F 16/29; G06F 40/279; G06F 40/289; G01C 21/3679
See application file for complete search history.

(56) References Cited

U.S. PATENT DOCUMENTS

| 8,521,539 B1 | 8/2013 | Teng et al. |
| 2007/0185650 A1 | 8/2007 | Yokota et al. |

(Continued)

FOREIGN PATENT DOCUMENTS

| CN | 103390004 | 11/2013 |
| CN | 103514199 | 1/2014 |

(Continued)

OTHER PUBLICATIONS

PCT International Preliminary Report on Patentability in International Application No. PCT/CN2017/000018, dated Jul. 17, 2018, 7 pages (with English translation).

(Continued)

*Primary Examiner* — Azam M Cheema
(74) *Attorney, Agent, or Firm* — Fish & Richardson P.C.

(57) ABSTRACT

A plurality of abbreviated names are generated for evaluation based on a full name of a point-of-interest (POI) on a map. A plurality of address names comprising the full name of the POI or any of the abbreviated names to be evaluated are obtained from a predetermined area of the POI. A phrase status vector used to indicate a location status of the target phrase in each particular address name is calculated for a target phrase based on each address name, the target phrase including the full name of the POI or any of the abbreviated names to be evaluated. A similarity is calculated between a phrase status vector for the full name of the POI and a phrase status vector. A particular abbreviated name corresponding with a calculated similarity greater than a predetermined threshold is associated with the full name of the POI corresponding to the calculated similarity.

20 Claims, 4 Drawing Sheets

(51) Int. Cl.
*G06F 16/29* (2019.01)
*G06F 16/00* (2019.01)
*G06F 40/279* (2020.01)
*G06F 40/289* (2020.01)

(56) References Cited

U.S. PATENT DOCUMENTS

| | | | |
|---|---|---|---|
| 2007/0220037 | A1 | 9/2007 | Srivastava et al. |
| 2008/0082483 | A1* | 4/2008 | Lim ..................... G06F 16/313 |
| 2010/0023259 | A1 | 1/2010 | Krumm et al. |
| 2012/0296932 | A1* | 11/2012 | Bao .......................... G06F 16/20 |
| | | | 707/769 |
| 2014/0278291 | A1 | 9/2014 | Zheng et al. |
| 2018/0011928 | A1* | 1/2018 | Li ............................ H04L 67/22 |

FOREIGN PATENT DOCUMENTS

| | | |
|---|---|---|
| CN | 103885950 | 6/2014 |
| CN | 104216895 | 12/2014 |
| CN | 104933171 | 9/2015 |
| CN | 105224660 | 1/2016 |
| CN | 105808609 | 7/2016 |
| JP | 5103051 | 12/2012 |
| JP | 2014199580 | 10/2014 |
| KR | 20100095130 | 8/2010 |
| KR | 20120030390 | 3/2012 |
| TW | I506247 | 11/2015 |

OTHER PUBLICATIONS

Yeon et al, "Measuring Method of String Similarity for POI Data Retrieval", Journal of KIISE JOK: Computing Practice and Letters, Apr. 2013, 9 pages (with English abstract).
Extended European Search Report in European application No. 17738076.3, dated Jul. 18, 2019, 11 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: a Peer-to-Peer Electronic Cash System," www.bitcoin.org, 2005, 9 pages.
International Search Report issued by the International Searching Authority issued in International Application No. PCT/CN2017/000018 dated Mar. 1, 2017; 9 pages.
Yang, et al., "POI Allomorph Database Construction System," Communications of the Korean Institute of Information Scientists and Engineers Thesis: Software and Application, 36(2), Mar. 2009, 10 pages (with English abstract).

* cited by examiner

METHOD AND APPARATUS FOR OBTAINING ABBREVIATED NAME OF POINT OF INTEREST ON MAP

This application is a continuation of PCT Application No. PCT/2017/000018, filed on Jan. 3, 2017, which claims priority to Chinese Patent Application No. 201610015852.7, filed on Jan. 11, 2016, and each application is hereby incorporated by reference in its entirety.

TECHNICAL FIELD

The present disclosure relates to computer technologies, and in particular, to methods and apparatuses for obtaining an abbreviated name of a point-of-interest on a map.

BACKGROUND

A point-of-interest (POI) on a map can be a house, a shop, a school, a bus stop, etc. When the map is searched for a POI, a commonly used search method is to search for the POI by using an abbreviated name of the POI. For example, when the map is searched for "Beijing Normal University", an abbreviated name "BNU" of "Beijing Normal University" can be alternatively entered to locate the university on the map. Therefore, to support the method for searching a POI by using an abbreviated name of the POI, some abbreviated names corresponding to a full name of the POI need to be obtained to establish a mapping relationship between the full name and the abbreviated name. As such, a corresponding full name can be determined accurately based on an abbreviated name entered by a map user, and a target address searched for by the user can be fed back to the user. In the existing technology, an abbreviated name of a POI is usually obtained through manual labeling, but the workload for manual labeling can be relatively high and efficiency is relatively low. As the data volume of a map increases, the efficiency of the manual labeling can become even lower.

SUMMARY

To resolve problems in the existing technology, the present disclosure provides a method and an apparatus for obtaining an abbreviated name of a point-of-interest (POI) on a map, so as to improve efficiency of obtaining an abbreviated name of a POI on a map.

According to a first aspect of implementations of the present disclosure, a method for obtaining an abbreviated name of a POI on a map is provided, including: generating a plurality of abbreviated names to be evaluated based on a full name of a POI on a map; obtaining, from a predetermined area of the POI, a plurality of address names including the full name of the POI or any of the abbreviated names to be evaluated; calculating a phrase status vector of a target phrase based on the address name, where the phrase status vector is used to indicate a location status of the target phrase in the address name, and the target phrase is the full name of the POI or any of the abbreviated names to be evaluated; separately calculating similarity between a phrase status vector of the full name of the POI and a phrase status vector of any of the abbreviated names to be evaluated; and determining an abbreviated name to be evaluated corresponding to similarity greater than a predetermined threshold as an abbreviated name of the POI corresponding to the full name of the POI.

According to a second aspect of the implementations of the present disclosure, an apparatus for obtaining an abbreviated name of a POI on a map is provided, including: a to-be-evaluated abbreviated name generation module, configured to generate a plurality of abbreviated names to be evaluated based on a full name of a POI on a map; a related address acquisition module, configured to obtain, from a predetermined area of the POI, a plurality of address names including the full name of the POI or any of the abbreviated names to be evaluated; a phrase status calculation module, configured to calculate a phrase status vector of a target phrase based on the address name, where the phrase status vector is used to indicate a location status of the target phrase in the address name, and the target phrase is the full name of the POI or any of the abbreviated names to be evaluated; a similarity calculation module, configured to separately calculate similarity between a phrase status vector of the full name of the POI and a phrase status vector of any of the abbreviated names to be evaluated; and an abbreviated name determining module, configured to determine an abbreviated name to be evaluated corresponding to similarity greater than a predetermined threshold as an abbreviated name of the POI corresponding to the full name of the POI.

The technical solutions provided in the implementations of the present disclosure can include the following beneficial effects: By using the method, when a full name of a POI is provided, a related address name near the POI can be automatically obtained from a map address library, and an abbreviated name that can be an abbreviated name of the full name in all possible abbreviated names to be evaluated is calculated based on the address name, so as to automatically determine the abbreviated name, thereby improving efficiency of obtaining an abbreviated name of a POI on a map.

It should be understood that the previous general description and the following detailed description are merely examples and explanations, and are not intended to limit the present disclosure.

BRIEF DESCRIPTION OF DRAWINGS

The accompanying drawings here are incorporated in the specification, constitute a part of the specification, show implementations that are in accordance with the present disclosure, and are used with the specifications to illustrate principles of the present disclosure.

DESCRIPTION OF IMPLEMENTATIONS

Figure 1:
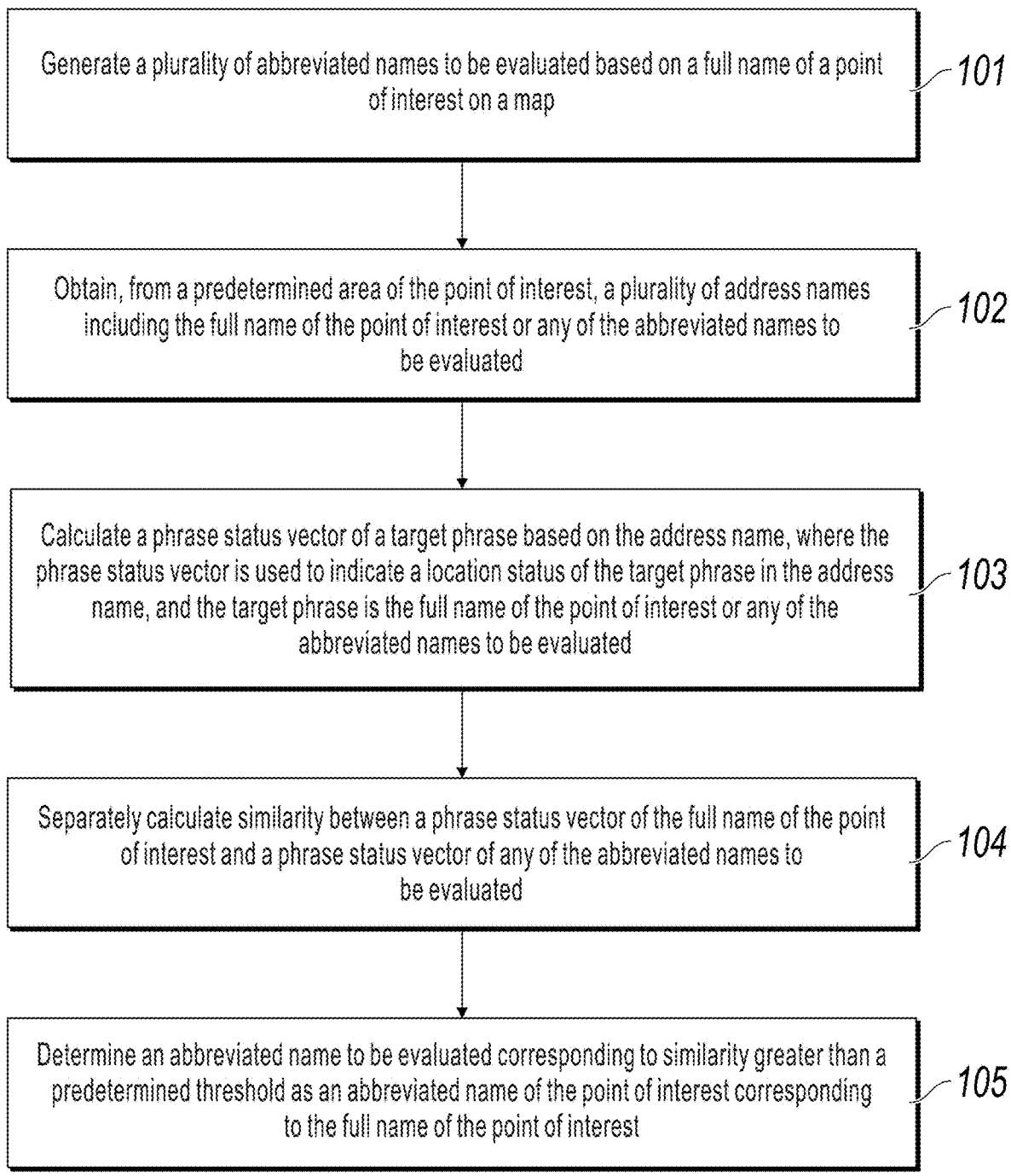
FIG. 1 is a flowchart illustrating a method for obtaining an abbreviated name of a point of interest (POI) on a map, according to an example implementation.

Example implementations are described here, and the examples are presented in the accompanying drawings. When the following description refers to the accompanying drawings, unless specified otherwise, same numbers in different drawings represent the same or similar elements. Implementations described in the following example implementations do not represent all implementations consistent with the present disclosure. On the contrary, they are examples of apparatuses and methods as described in the claims and that are consistent with some aspects of the present disclosure.

The implementations of the present application provide a method for obtaining an abbreviated name of a point of interest (POI) on a map. The method is a solution in which a corresponding abbreviated name is automatically obtained based on a full name of a POI without being manually labeled, so as to improve efficiency of obtaining the abbreviated name.

The abbreviated name acquisition method is based on the following principles: When a POI is used for naming an address, the full name and the abbreviated name of a POI appear in substantially similar locations in the detailed addresses. The full name and the abbreviated name are usually used in address names that correspond to the same location or geographically proximate locations.

For example, the POI is a school. Assuming that a full name of the school is Beijing Normal University, there are usually many address names using the school name inside or around the university, for example, Beijing Normal University Cafeteria, BNU Bookstore, Beijing Normal Dormitory Section A, BN Education Center, etc. (it should be noted that the previous names are just examples used for describing the solution of the present application and may not actually exist). It can be seen that some address names use the full name, for example, "Beijing Normal University" in "Beijing Normal University Cafeteria"; and some address names use abbreviated names, for example, "BNU" in "BNU Bookstore", and "BN" in "BN Education Center".

In the previous example, a full name or an abbreviated name of a POI is applied to an address name, and the full name and the abbreviated name satisfy the two aspects mentioned above.

First, the full name and the abbreviated name are used in address names that correspond to the same location or geographically proximate locations. For example, "Beijing Normal University Cafeteria", "BNU Bookstore", and "Beijing Normal Dormitory Section A" are all located inside or around "Beijing Normal University".

Second, the full name and the abbreviated name of a POI appear in substantially similar locations in the detailed addresses. "Beijing Normal University" is used as an example. For the abbreviated name "BNU" of "Beijing Normal University", if a detailed address string is described as "19 Xinjiekou Street, Beijing Normal University Library, Beijing", in an address library, there may be an address string described as "19 Xinjiekou Street, BNU Library, Beijing", or a string similar to "Xinjiekou Street, BNU Library, Beijing". It shows that locations of the full name and the abbreviated name of the POI are substantially similar in the address library, and in other words, the context is substantially similar.

For example, for a large-scale address text library, a pair of full name and abbreviated name can have same phrases before and after. For example, in the address library of the previous example, the full name "Beijing Normal University" and the corresponding abbreviated name "BNU" all have phrases "Xinjiekou Street" before and phrase "Library" after. For example, phrases before and after a pair of full name and abbreviated name include "Cafeteria", "Library", and "Building". These phrases can form a vector {Cafeteria, Library, Building}, and each phrase is a dimension of the vector.

TABLE 1

Vector dimensions corresponding to a full name ("Beijing Normal University") and an abbreviated name ("BNU"):

| Dimension | Full name | Abbreviated name | |
|---|---|---|---|
| Cafeteria | 117 | 32 | |
| Library | 267 | 71 | |
| Building | 422 | 112 | |
| | | Cosine similarity | 0.999977577 |

In the example shown in Table 1, "Cafeteria" appears 117 times in detailed address strings including the full name, and "Cafeteria" appears 32 times in detailed address strings including the abbreviated name. Similarly, for the full name and the abbreviated name, "Library" respectively appears 267 times and 71 times, and "Building" respectively appears 422 times and 112 times. It can be seen that numbers of appearances of the three dimensions are basically proportional. That is, a vector corresponding to the full name "Beijing Normal University" is {117, 267, 422}, and a vector corresponding to the abbreviated name "BNU" is {32, 71, 112}. If cosine similarity between the two vectors is calculated, it can be seen that the cosine value is very close to 1.

Based on the previous principle, for a procedure of the method for obtaining an abbreviated name of a POI, refer to FIG. 1. The method includes the steps below.

Step 101: Generate a plurality of abbreviated names to be evaluated based on a full name of a POI on a map.

In the step, single words included in the full name of the POI can be combined in a single word arrangement sequence, to form combinations of any number of single words, where each combination is an abbreviated name, and a plurality of abbreviated names are obtained.

Continuing with "Beijing Normal University" as an example. The full name in Chinese Pinyin includes six single words: "Bei", "Jing", "Shi", "Fan", "Da", and "Xue". Then these single words are combined to form combinations of any number of single words. When a number of single words is 2, two single words are combined, for example, "Beijing", "Jingshi", "Shifan", "Fanda", "Daxue", "Beishi", "Beifan", etc. It can be seen that during the combination, the single words are combined in arrange sequences of the single words in the full name. That is, the sequence of each single word in the combination is the same as the sequence of the single word in the full name. When the number of single words is 3, three single words are combined, for example, "Beijingshi", "Jingshifan", "Beishifan", etc.

After a plurality of abbreviated names are obtained through arbitrary combination, a single word and a noise phrase determined as an abbreviated name of a non-POI can be further removed from the plurality of abbreviated names, and a remaining abbreviated name is the to-be-evaluated abbreviated name. As such, a quantity of abbreviated names to be evaluated participating in subsequent processing steps is decreased, thereby improving processing efficiency of the procedure. Single words are the previous "Bei", "Jing", "Shi", etc., and the noise phrase includes "Beijing", "Shifan", "Daxue", etc. It is usually impossible for a user to enter these commonly used phrases as abbreviated names of "Beijing Normal University".

Step 102: Obtain, from a predetermined area of the POI, a plurality of address names including the full name of the POI or any of the abbreviated names to be evaluated.

For example, the predetermined area can be an area within 500 meters near the POI, such as "Beijing Normal University Cafeteria", "BNU Bookstore", "Beijing Normal Dormitory Section A", and "BN Education Center" enumerated above. These address names include either the full name "Beijing Normal University" of the POI or an abbreviated name to be evaluated such as "BNU". The abbreviated names to be evaluated are the abbreviated names of the POI on the map determined in step 101.

Step 103: Calculate a phrase status vector of a target phrase based on the address name, where the phrase status vector is used to indicate a location status of the target phrase in the address name, and the target phrase is the full name of the POI or any of the abbreviated names to be evaluated.

The phrase status vector calculated in the step can be a multidimensional vector, for example, an n-dimensional vector (A1, A2, ..., An). In addition, a corresponding phrase status vector can be obtained through calculation for each of the full name of the POI and any of the abbreviated names to be evaluated. For example, a phrase status vector corresponding to the full name "Beijing Normal University" is (A1, A2, ..., An), and a phrase status vector corresponding to one of the abbreviated names "BNU" is (B1, B2, ..., Bn).

The phrase status vector can be calculated with reference to the plurality of address names obtained in step 102, and a method for calculating the phrase status vector of the full name of the POI is the same as that for calculating the phrase status vector of the abbreviated name to be evaluated. If the full name of the POI or any of the abbreviated names is referred to as the target phrase, the phrase status vector of one of the target phrases can be calculated in the following method:

A plurality of address names can be obtained in step 102, for example, "BNU Bookstore", "BN Education Center", etc. For a target phrase, for example, the target phrase is "BNU", address names including "BNU" are found, such as "BNU Bookstore". There can be a plurality of address names including the target phrase. A neighboring phrase of the target phrase can be obtained from each address name including the target phrase, and the neighboring phrases include phrases before and after.

For example, in the address name "BNU Bookstore" including the target phrase "BNU", the phrase before the target phrase is "null" (that is, there is no phrase previous to the target phrase), and the phrase after is "Bookstore". As another example, in an address name "Bowen BNU Bookstore" including the target phrase "BNU", the phrase before the target phrase is "Bowen", and the phrase after is "Bookstore". After statistics collection, in all address names including the target phrase, there can be a plurality of neighboring phrases of the target phrase, such as the previously enumerated "null", "Bookstore", "Bowen", and "Bookstore". Assume that only the four neighboring phrases (there can be more neighboring phrases in practice), the four phrases each can correspond to a vector dimension of the phrase status vector of the target phrase, and the vector (null, Bookstore, Bowen, Bookstore) is a four-dimensional vector.

A dimension value of phrase can be the frequency that the phrase appears in the address names. Using "Bookstore" as an example. Assume that 10 address names are obtained in step 102, and "Bookstore" appears twice, the frequency or dimension value of "Bookstore" is 2. Other dimension values can be similarly calculated and is not described again.

Step 104: Separately calculate similarity between a phrase status vector of the full name of the POI and a phrase status vector of any of the abbreviated names to be evaluated.

For example, after the phrase status vector of the full name of the POI and the phrase status vector of any of the abbreviated names to be evaluated are calculated in step 103, similarity between the phrase status vector of the full name of the POI and the phrase status vector of each abbreviated name to be evaluated is calculated. The similarity calculated in the example can be cosine similarity.

Figure 2:
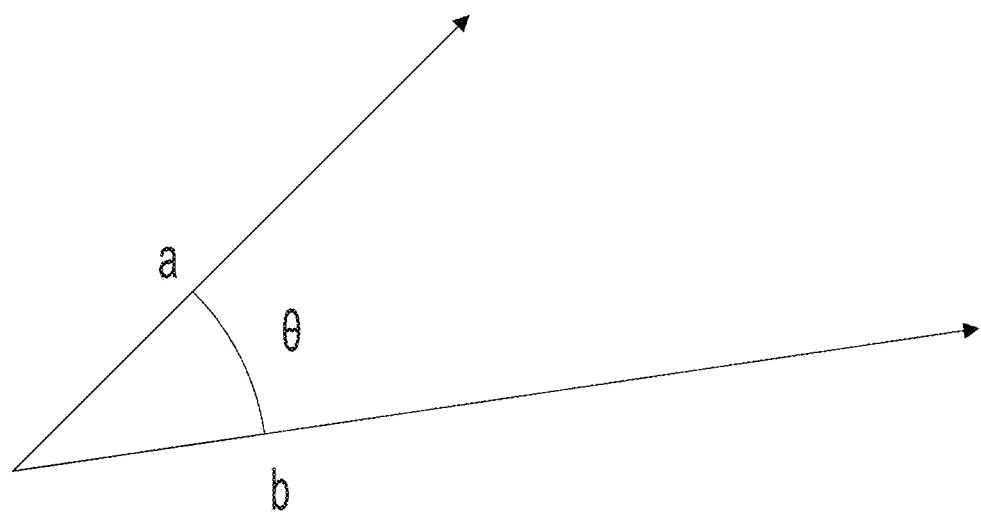
FIG. 2 shows a principle of calculating cosine similarity in two-dimensional space, according to an example implementation.

Referring to FIG. 2, FIG. 2 shows calculation of cosine similarity in two-dimensional space, and a and b are two two-dimensional vectors. It is assumed that coordinates of a are (x1, y1) and coordinates of b are (x2, y2). The two vectors are drawn into vector space based on the coordinate values, as shown in FIG. 2. Then a cosine value corresponding to an angle between the two two-dimensional vectors a and b is calculated, and the cosine value can be used to represent similarity between the two vectors. If the two vectors are more similar, an angle between the two vectors is smaller, the cosine value is closer to 1, and their directions are more similar.

The cosine value of the angle is calculated based on a vector dot product equation expressed as follows:

$$\cos\theta = \frac{x_1 x_2 + y_1 y_2}{\sqrt{x_1^2 + y_1^2} \times \sqrt{x_2^2 + y_2^2}}.$$

The previous equation can be extended to calculate cosine similarity between multidimensional vectors. If the phrase status vector of the full name of the POI is A=(A1, A2, ..., An), and the phrase status vector of one of the abbreviated names to be evaluated is (B1, B2, ..., Bn), cosine similarity between the two vectors is calculated as:

$$\cos\theta = \frac{\sum_{1}^{n}(A_i + B_i)}{\sqrt{\sum_{1}^{n} A_i^2} \times \sqrt{\sum_{1}^{n} B_i^2}}.$$

Step 105: Determine an abbreviated name to be evaluated corresponding to similarity greater than a predetermined threshold as an abbreviated name of the POI corresponding to the full name of the POI.

For example, if the predetermined threshold is 0.42, when a calculated value of the cosine similarity is greater than or equal to 0.42, an abbreviated name to be evaluated corresponding to the similarity can be determined as the abbreviated name of the POI corresponding to the full name of the POI. For example, if cosine similarity between a phrase status vector A of the full name "Beijing Normal University" of the POI and a phrase status vector B of one of the abbreviated names "BNU" is 0.7, it can be determined that the abbreviated name "BNU" is used as the abbreviated name of the full name "Beijing Normal University".

In the example, there is at least one abbreviated name greater than the predetermined threshold. For example, the abbreviated name of the full name "Beijing Normal University" can include a plurality of abbreviated names, such as "BNU", "BN", and "Beijing Normal".

In the method for obtaining an abbreviated name of a POI on a map, when a full name of a POI is provided, a related address name near the POI can be automatically obtained from a map address library, and an abbreviated name in all possible abbreviated names can be calculated based on the address, so as to automatically determine the abbreviated name. As such, the efficiency of obtaining the abbreviated name can be improved. In addition, the method can be performed on a distributed computing platform, so as to further improve a processing speed.

After a mapping relationship between a full name and an abbreviated name of a POI is determined, the mapping relationship can be used to search a POI on a map, or another scenario related to address entry. For example, when a user enters "Dongwai Avenue", it can be seen through comparison of a full name and an abbreviated name that a full name of "Dongwai Avenue" is "Dongzhimen Avenue". Then the user can be asked whether to enter Dongzhimen Avenue. In addition, subsequent possible detailed addresses related to Dongzhimen Avenue are provided as auto-complete options for the user to select, for example, addresses such as restaurants and hotels near Dongzhimen Avenue.

Figure 3:
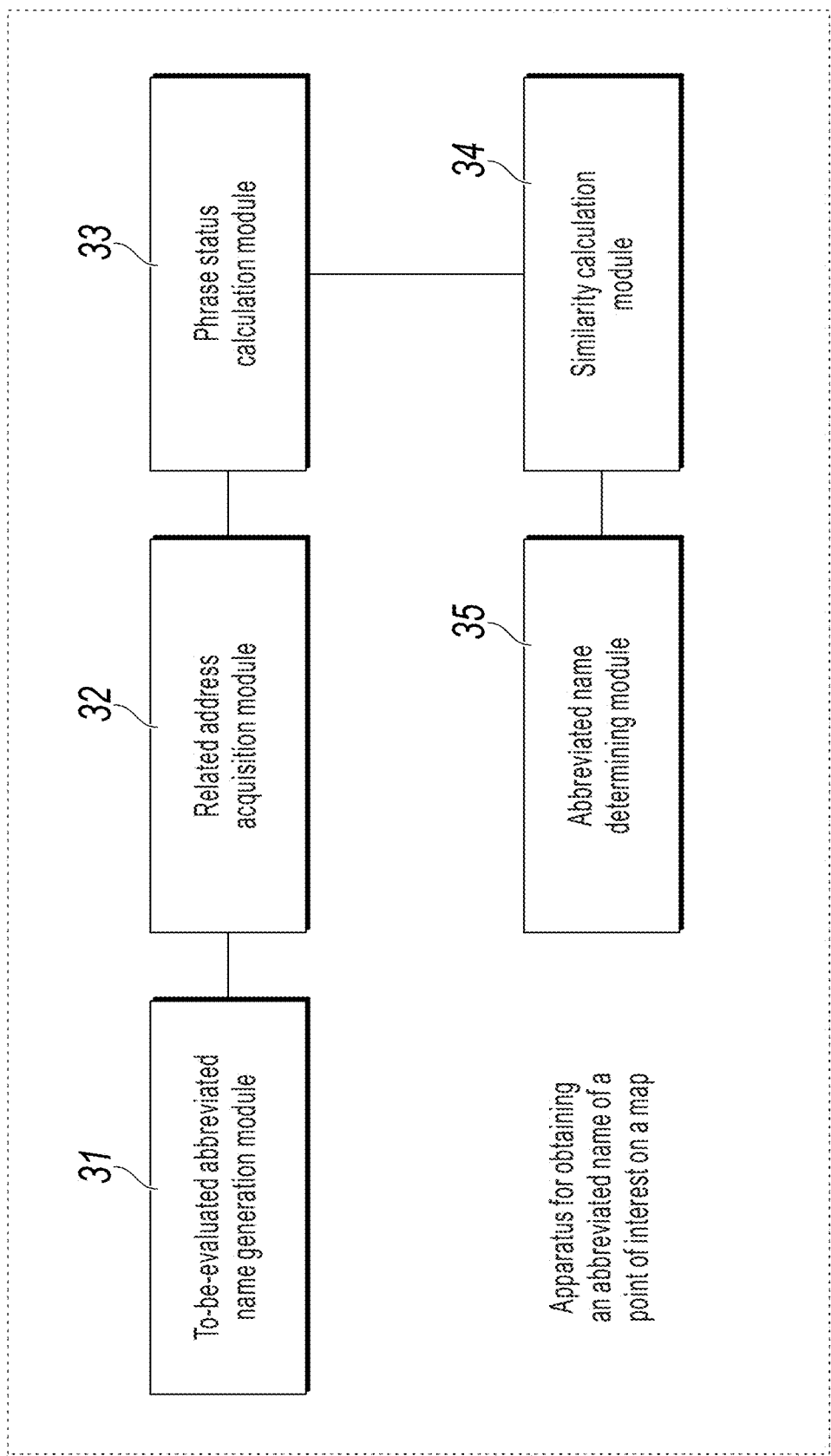
FIG. 3 shows an apparatus for obtaining an abbreviated name of a POI on a map, according to an example implementation.

The implementations of the present application further provide an apparatus for obtaining an abbreviated name of a POI on a map. As shown in FIG. 3, the apparatus can include a to-be-evaluated abbreviated name generation module 31, a related address acquisition module 32, a phrase status calculation module 33, a similarity calculation module 34, and an abbreviated name determining module 35.

The to-be-evaluated abbreviated name generation module 31 is configured to generate a plurality of abbreviated names to be evaluated based on a full name of a POI on a map.

The related address acquisition module 32 is configured to obtain, from a predetermined area of the POI, a plurality of address names including the full name of the POI or any of the abbreviated names to be evaluated.

The phrase status calculation module 33 is configured to calculate a phrase status vector of a target phrase based on the address name, where the phrase status vector is used to indicate a location status of the target phrase in the address name, and the target phrase is the full name of the POI or any of the abbreviated names to be evaluated.

The similarity calculation module 34 is configured to separately calculate similarity between a phrase status vector of the full name of the POI and a phrase status vector of any of the abbreviated names to be evaluated.

The abbreviated name determining module 35 is configured to determine an abbreviated name corresponding to similarity greater than a predetermined threshold as an abbreviated name of the POI corresponding to the full name of the POI.

In an example, when generating the plurality of abbreviated names to be evaluated based on the full name of the POI on the map, the to-be-evaluated abbreviated name generation module 31 is configured to: combine single words included in the full name of the POI in a single word arrangement sequence, to form combinations of any number of single words, where each combination is an abbreviated name, and a plurality of abbreviated names are obtained; and remove, from the plurality of abbreviated names, a single word and a noise phrase determined as an abbreviated name of a non-POI, where a remaining abbreviated name is the to-be-evaluated abbreviated name.

In an example, when calculating the phrase status vector of the target phrase based on the address name, the phrase status calculation module 33 is configured to obtain a neighboring phrase of the target phrase from any of the plurality of address names, and use a frequency that each neighboring phrase appears in the plurality of address names as a dimension value of a vector dimension of the phrase status vector of the target phrase.

In an example, the similarity calculation module 34 is configured to calculate cosine similarity between the phrase status vector of the full name of the POI and the phrase status vector of any of the abbreviated names to be evaluated.

In an example, there is at least one to-be-evaluated abbreviated name corresponding to the similarity greater than the predetermined threshold.

A person skilled in the art can easily figure out another implementation solution of the present disclosure after considering the specifications and practicing the present disclosure. The present application is intended to cover any variations, functions, or adaptive changes of the present disclosure. These variations, functions, or adaptive changes comply with general principles of the present disclosure, and include common knowledge or a commonly used technical means in the technical field that is not disclosed in the present application. The specification and the implementations are merely considered as examples, and the actual scope and the spirit of the present disclosure are described by the following claims.

It should be understood that the present disclosure is not limited to the structures that are described above and that are shown in the accompanying drawings, and modifications and changes can be made without departing from the scope of the present disclosure. The protection scope of the present disclosure is defined by the appended claims.

Figure 4:
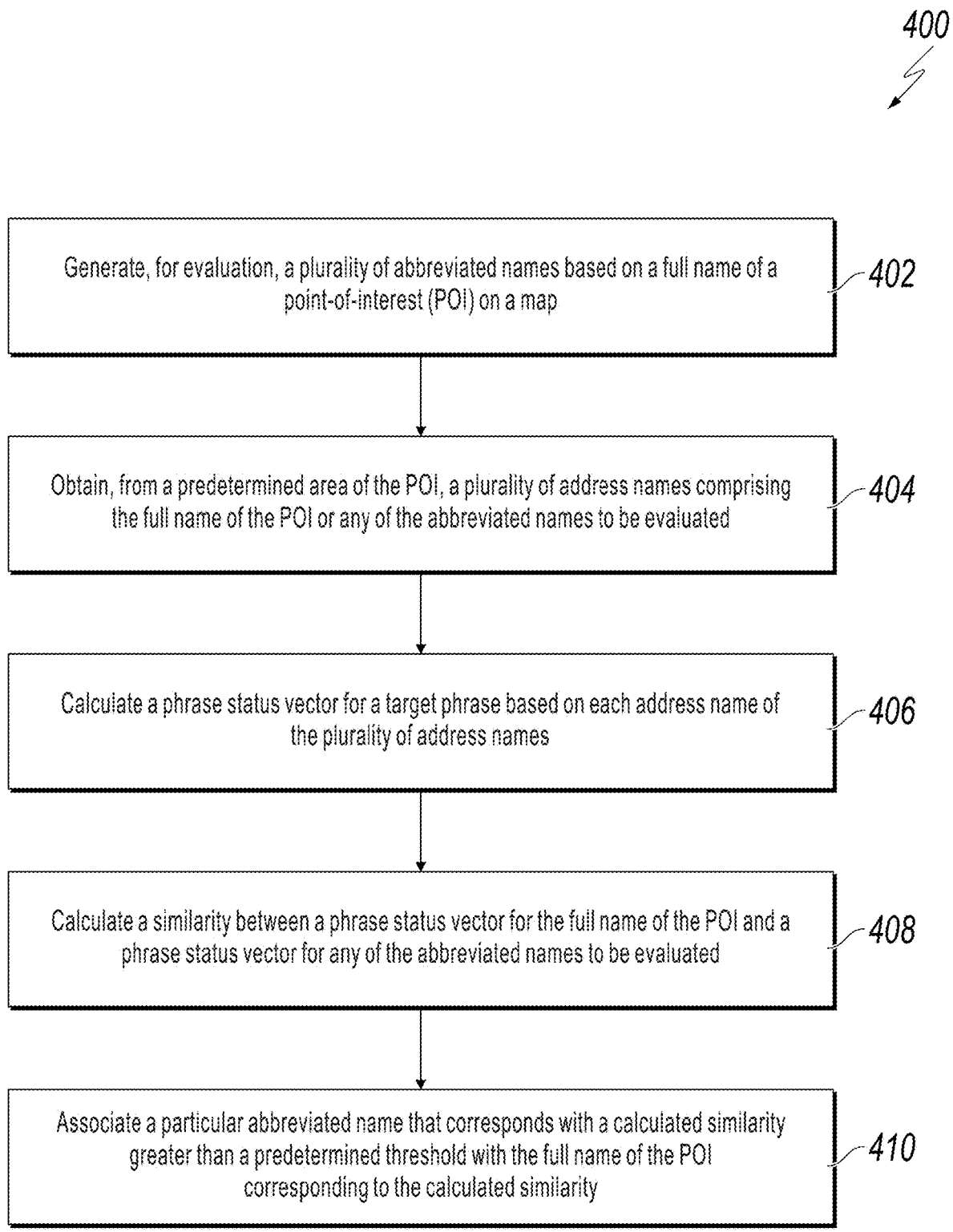
FIG. 4 is a flowchart illustrating an example of a computer-implemented method for obtaining an abbreviated name of a point-of-interest on a map, according to an implementation of the present disclosure.

FIG. 4 is a flowchart illustrating an example of a computer-implemented method 400 for obtaining an abbreviated name of a POI on a map, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a plurality of abbreviated names are generated for evaluation based on a full name of a point-of-interest (POI) on a map. In some implementations, the generation combines single words forming the full name of the POI into a plurality of arrangement sequences, where each particular arrangement sequence is an abbreviated name. A single word and a noise phrase determined as an abbreviated name of a non-POI is removed from the plurality of arrangement sequences, where a remaining abbreviated name is the to-be-evaluated abbreviated name. From 402, method 400 proceeds to 404.

At 404, obtain, from a predetermined area of the POI, a plurality of address names including the full name of the POI or any of the abbreviated names to be evaluated. From 404, method 400 proceeds to 406.

At 406, a phrase status vector is calculated for a target phrase based on each address name of the plurality of address names, where the phrase status vector is used to indicate a location status of the target phrase in each particular address name, and the target phrase includes the full name of the POI or any of the abbreviated names to be evaluated. In some implementations, the calculation of the phrase status vector includes obtaining a neighboring phrase of the target phrase from any of the plurality of address names. A frequency that each neighboring phrase appears in the plurality of address names is used as a dimensional value for a vector dimension of the phrase status vector. From 406, method 400 proceeds to 408.

At 408, a similarity is calculated between a phrase status vector for the full name of the POI and a phrase status vector for any of the abbreviated names to be evaluated. In some implementations, the calculation of the similarity is a cosine similarity calculation. From 408, method 400 proceeds to 410.

At 410, a particular abbreviated name that corresponds with a calculated similarity greater than a predetermined threshold is associated with the full name of the POI corresponding to the calculated similarity. In some implementations, there is at least one to-be-evaluated abbreviated name corresponding to the calculated similarity greater than the predetermined threshold. After 410, method 400 stops.

In existing technology, an abbreviated name of a POI is usually obtained through manual labeling, but the workload for manual labeling can be relatively high and efficiency is relatively low. As the data volume of a map increases, the efficiency of the manual labeling can become even lower. The technical solutions provided in the implementations of the present disclosure can include the following beneficial technical effects. By using the described methodology, when a full name of a POI is provided, a related address name near the POI can be automatically obtained from a map address library, and an abbreviated name is automatically calculated based on the related address name. The calculation of the abbreviated name improves efficiency for obtaining an abbreviated name of a POI on a map. Additionally, the described methodology can be performed on a distributed computing platform, so as to further improve processing speed and speed of data processing and data set completeness. Moreover, after a plurality of abbreviated names are obtained through arbitrary combination, a single word and a noise phrase determined as an abbreviated name of a non-POI can be further removed from the plurality of abbreviated names, and a remaining abbreviated name is the to-be-evaluated abbreviated name. As such, a quantity of abbreviated names to be evaluated participating in subsequent processing steps is decreased, thereby improving processing efficiency of the procedure. It is simply unreasonable for users to enter all commonly used phrases as abbreviated names of a POI in a manner for optimal usability. The described methodology permits enhancement of data set completeness and accuracy with respect to map data. The enhanced map data can be used to improve usability and accuracy of graphical user interfaces, particularly related to interactive maps. Moreover, the enhanced map data can be used to render more concise, yet understandable, graphical user interfaces containing more data than previously possible. The enhanced graphical user interfaces allow for a more efficient user experience, reduced computational requirements for the graphical user interface, and overall computing system efficiency. For example, abbreviated address name data allows for reduced network transmission, data storage, and graphical user interface/computer display processing requirements.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
generating, for evaluation, a plurality of abbreviated names based on a full name of a point-of-interest (POI) on a map;
obtaining, from a predetermined area of the POI, a plurality of address names comprising the full name of the POI or any of the abbreviated names to be evaluated;
calculating a phrase status vector for a target phrase based on each address name of the plurality of address names, wherein the phrase status vector is used to indicate a location status of the target phrase in each particular address name, and the target phrase includes the full name of the POI or any of the abbreviated names to be evaluated;
calculating a similarity between a phrase status vector for the full name of the POI and a phrase status vector for any of the abbreviated names to be evaluated; and
associating a particular abbreviated name that corresponds with a calculated similarity greater than a predetermined threshold with the full name of the POI corresponding to the calculated similarity.

2. The computer-implemented method of claim 1, wherein the generation comprises combining single words forming the full name of the POI into a plurality of arrangement sequences, wherein each particular arrangement sequence is an abbreviated name.

3. The computer-implemented method of claim 2, further comprising removing, from the plurality of arrangement sequences, a single word and a noise phrase determined as an abbreviated name of a non-POI, wherein a remaining abbreviated name is the to-be-evaluated abbreviated name.

4. The computer-implemented method of claim 1, wherein the calculation of the phrase status vector comprises obtaining a neighboring phrase of the target phrase from any of the plurality of address names.

5. The computer-implemented method of claim 4, further comprising using a frequency that each neighboring phrase appears in the plurality of address names as a dimensional value for a vector dimension of the phrase status vector.

6. The computer-implemented method of claim 1, wherein the calculation of the similarity is a cosine similarity calculation.

7. The computer-implemented method of claim 1, wherein there is at least one to-be-evaluated abbreviated name corresponding to the calculated similarity greater than the predetermined threshold.

8. A non-transitory, computer-readable medium storing one or more instructions executable by a computer system to perform operations comprising:
generating, for evaluation, a plurality of abbreviated names based on a full name of a point-of-interest (POI) on a map;
obtaining, from a predetermined area of the POI, a plurality of address names comprising the full name of the POI or any of the abbreviated names to be evaluated;
calculating a phrase status vector for a target phrase based on each address name of the plurality of address names, wherein the phrase status vector is used to indicate a location status of the target phrase in each particular address name, and the target phrase includes the full name of the POI or any of the abbreviated names to be evaluated;

calculating a similarity between a phrase status vector for the full name of the POI and a phrase status vector for any of the abbreviated names to be evaluated; and associating a particular abbreviated name that corresponds with a calculated similarity greater than a predetermined threshold with the full name of the POI corresponding to the calculated similarity.

9. The non-transitory, computer-readable medium of claim 8, wherein the generation comprises one or more instructions to combine single words forming the full name of the POI into a plurality of arrangement sequences, wherein each particular arrangement sequence is an abbreviated name.

10. The non-transitory, computer-readable medium of claim 9, further comprising one or more instructions to remove, from the plurality of arrangement sequences, a single word and a noise phrase determined as an abbreviated name of a non-POI, wherein a remaining abbreviated name is the to-be-evaluated abbreviated name.

11. The non-transitory, computer-readable medium of claim 8, wherein the calculation of the phrase status vector comprises obtaining a neighboring phrase of the target phrase from any of the plurality of address names.

12. The non-transitory, computer-readable medium of claim 11, further comprising one or more instructions to use a frequency that each neighboring phrase appears in the plurality of address names as a dimensional value for a vector dimension of the phrase status vector.

13. The non-transitory, computer-readable medium of claim 8, wherein the calculation of the similarity is a cosine similarity calculation.

14. The non-transitory, computer-readable medium of claim 8, wherein there is at least one to-be-evaluated abbreviated name corresponding to the calculated similarity greater than the predetermined threshold.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
generating, for evaluation, a plurality of abbreviated names based on a full name of a point-of-interest (POI) on a map;

obtaining, from a predetermined area of the POI, a plurality of address names comprising the full name of the POI or any of the abbreviated names to be evaluated;

calculating a phrase status vector for a target phrase based on each address name of the plurality of address names, wherein the phrase status vector is used to indicate a location status of the target phrase in each particular address name, and the target phrase includes the full name of the POI or any of the abbreviated names to be evaluated;

calculating a similarity between a phrase status vector for the full name of the POI and a phrase status vector for any of the abbreviated names to be evaluated; and associating a particular abbreviated name that corresponds with a calculated similarity greater than a predetermined threshold with the full name of the POI corresponding to the calculated similarity.

16. The computer-implemented system of claim 15, wherein the generation comprises combining single words forming the full name of the POI into a plurality of arrangement sequences, wherein each particular arrangement sequence is an abbreviated name.

17. The computer-implemented system of claim 16, further comprising one or more operations to remove, from the plurality of arrangement sequences, a single word and a noise phrase determined as an abbreviated name of a non-POI, wherein a remaining abbreviated name is the to-be-evaluated abbreviated name.

18. The computer-implemented system of claim 15, wherein the calculation of the phrase status vector comprises one or more operations to:
obtain a neighboring phrase of the target phrase from any of the plurality of address names; and
use a frequency that each neighboring phrase appears in the plurality of address names as a dimensional value for a vector dimension of the phrase status vector.

19. The computer-implemented system of claim 15, wherein the calculation of the similarity is a cosine similarity calculation.

20. The computer-implemented system of claim 15, wherein there is at least one to-be-evaluated abbreviated name corresponding to the calculated similarity greater than the predetermined threshold.

* * * * *